United States Patent [19]

Fukai et al.

[11] Patent Number: 4,799,640
[45] Date of Patent: Jan. 24, 1989

[54] VIBRATORY BODY MOUNTING STRUCTURE WITH A VIBRATION-CONDUCTION PREVENTING MECHANISM

[76] Inventors: Yoshio Fukai, 24-25-326, Asahi-cho, Sagamihara-shi, Kanagawa-ken; Hitoshi Takagi, 611, Oaza-hozumi, Kitsuregwa-cho, Shioya-gun, Tochigui-ken; Tatsuo Osawa, 9-23, Yayoi-cho 5-chome, Nakano-ku, Tokyo, all of Japan

[21] Appl. No.: 454,331

[22] Filed: Dec. 29, 1982

[30] Foreign Application Priority Data

Mar. 10, 1982 [JP] Japan ................................ 57-36635

[51] Int. Cl.⁴ ............................................ F16M 13/00
[52] U.S. Cl. .................................. 248/559; 180/292; 180/300; 248/635
[58] Field of Search ............... 248/559, 634, 635, 638, 248/659; 181/207; 180/291, 292, 300

[56] References Cited

U.S. PATENT DOCUMENTS

| 1,996,166 | 4/1935 | Meyer et al. | 248/559 |
| 3,588,008 | 6/1971 | Wyman | 248/635 |
| 3,913,696 | 10/1975 | Kennedy et al. | 180/292 X |
| 4,381,043 | 4/1983 | Fukushima | 180/300 |
| 4,456,213 | 6/1984 | Fukushima et al. | 248/559 |

FOREIGN PATENT DOCUMENTS

| 1260198 | 3/1961 | France | 181/207 |
| 52-9765 | 1/1977 | Japan | 248/559 |
| 1026358 | 4/1966 | United Kingdom | 248/559 |

Primary Examiner—Ramon S. Britts
Assistant Examiner—David L. Talbott

[57] ABSTRACT

A structure for mounting a vibratory body on a support includes an elongated mounting member having an elasticity. The mounting member is resiliently connected to the support and also to the vibratory body. The connection of the mounting member to the support is located at a position at which the phase of bounce-mode vibrations of the mounting member is opposite in sign to that of two-node-mode transverse vibrations of the mounting member.

12 Claims, 3 Drawing Sheets

VIBRATORY BODY MOUNTING STRUCTURE WITH A VIBRATION-CONDUCTION PREVENTING MECHANISM

BACKGROUND OF THE INVENTION

1. Field of the Invention

This invention relates to a vibratory body mounting structure with a vibration-conduction preventing mechanism applicable, for example, to an automotive power transmission or drive train mounting.

2. Description of the Prior Art

In automotive vehicles, structures for mounting power transmissions on vehicle bodies generally include insulators to reduce vibration conduction from the transmissions to the vehicle bodies. Conventional mounting structures have been unsatisfactory from the standpoint of preventing low-frequency, for example, 100–200 Hz, vibration conduction from the transmission to the vehicle bodies, which causes resonant vibration or noise in and around the vehicles.

SUMMARY OF THE INVENTION

It is an object of this invention to provide a vibratory body mounting structure with a vibration-conduction preventing mechanism which adequately reduces conduction of low-frequency vibrations.

In accordance with this invention, a structure for mounting a vibratory body on a support includes an elongated mounting member having an elasticity. The mounting member is resiliently connected to the support and also to the vibratory body. The connection of the mounting member to the support is located at a position at which the phase of bounce-mode vibrations of the mounting member is opposite in sign to that of two-node-mode transverse vibrations of the mounting member.

The above and other objects, features and advantages of this invention will be apparent from the following description of preferred embodiments thereof, taken in conjunction with the drawings.

DESCRIPTION OF THE PREFERRED EMBODIMENTS

Figure 1:
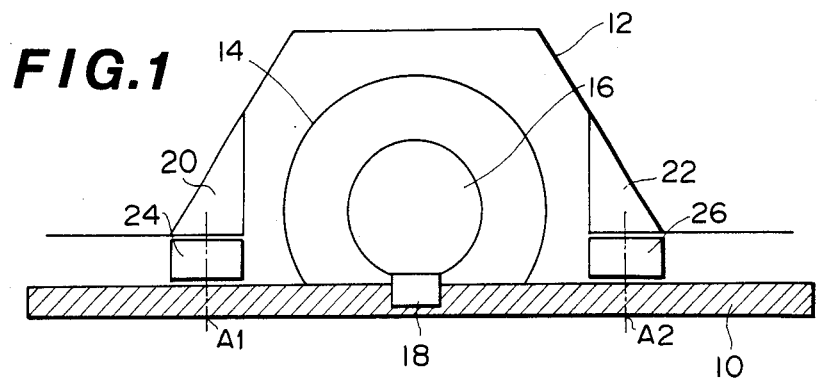
FIG. 1 is a diagrammatic view of an automotive power transmission mounting structure according to a first embodiment of this invention.

In FIG. 1, there is diagrammatically shown an automotive power transmission mounting structure according to a first embodiment of this invention. The mounting structure includes an elongated mounting member 10, which consists of a substantially straight shape-steel beam having a uniform cross-section and thus a uniform mass distribution. The mounting member 10 has a predetermined elasticity.

The mounting member 10 extends substantially perpendicular to the longitudinal axis of an automotive vehicle body 12 and below an automotive power transmission 14. The mounting member 10 is horizontal when the vehicle is on the horizontal. The lower surface of the vehicle body 12 has a recess accommodating the power transmission 14. In this case, the power transmission 14 constitutes a vibratory body, whereas the vehicle body 12 constitutes a support on which the vibratory body 12 is mounted via the mounting member 10. The power transmission 14 has a rear extension 16, which is mounted essentially on the center of the mounting member 10 via a resilient insulator 18. Vibration from the power transmission 14 is therefore applied essentially to the center of gravity of the mounting member 10. Actually, the housing of the rear extension 16 is mounted on the mounting member 10.

A pair of brackets 20 and 22 are fixed to the vehicle body 12. The mounting member 10 is connected to the brackets 20 and 22 via a pair of resilient insulators 24 and 26 respectively. In this way, the mounting member 10 is resiliently connected to the vehicle body 12. Preferably, the positions of the connection of the mounting member 10 to the brackets 20 and 22 or the insulators 24 and 26 are equally distant from the center of the mounting member 10 and on opposite sides thereof, and are also distant from the corresponding ends of the mounting member 10. These positions may alternatively be arranged asymmetrically with respect to the center of the mounting member 10 as long as they adhere to the limitations described hereinafter.

When a vibratory external force having a relatively low frequency, for example, of 40–400 Hz or 100–200 Hz is applied to the center of gravity of the mounting member 10, the resulting vibration of the mounting member 10 can be approximately expressed by the sum or resultant of different two vibration modes I and II.

Figure 2A:
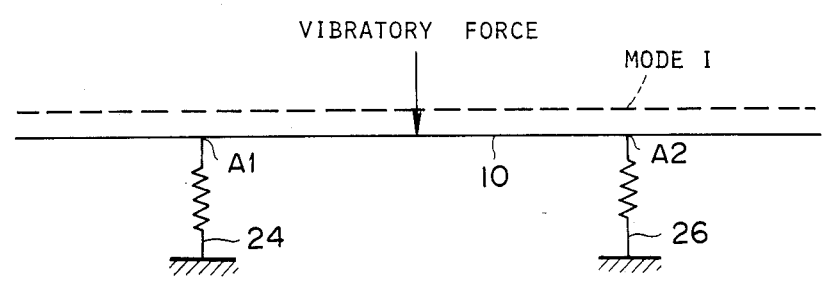
FIG. 2(a) and FIG. 2(b) are diagrams showing respectively two modes of vibration of the mounting member in FIG. 1.

One of the two opposite maximum displacements of the mounting member 10 due to the first mode I is shown by the solid and broken lines in FIG. 2(a), wherein the mounting member 10 and the insulators 24 and 26 in their rest or normal positions are shown schematically. The first mode I is referred to as a bounce vibration mode which results mainly from the resilient connection of the mounting member 10 to the vehicle body 12 via the insulators 24 and 26. The bounce mode I denotes vibration of the mounting member 10 in which the mounting member 10 moves up and down while remaining parallel to its rest or normal position without deformation. In other words, the direction and magnitude of the displacement of the mounting member 10 caused by the vibration of the bounce mode I are equal at all the points along the mounting member 10.

Figure 2B:
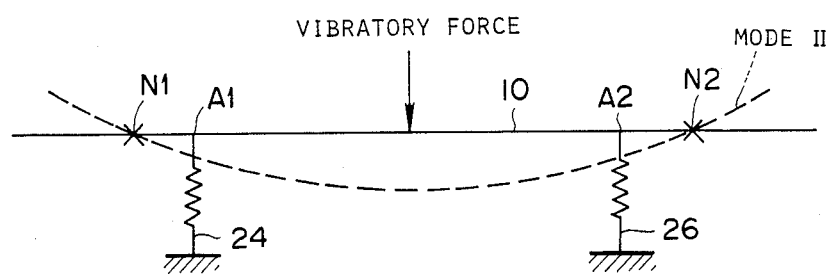

One of the two opposite maximum displacements of the mounting member 10 due to the second mode II is shown by the solid and broken lines in FIG. 2(b), wherein the mounting member 10 and the insulators 24 and 26 in their rest or normal positions are shown schematically. The second mode II is referred to as a two-mode transverse vibration mode which results mainly from the elasticity of the mounting member 10. The two-node mode II designates vibration of the mounting member 10 in which the mounting member 10 deforms transversely about two fixed points (nodes). The amplitude of the vibration of the two-node mode is maximum at the center and the ends of the mounting member 10, and is minimum or zero at the two points, that is, the two nodes, between the center and the respective ends of the mounting member 10. In this case, the direction of the displacement of the mounting member 10 between the two nodes is opposite that outside of the two nodes. The two-node mode II is approximately similar to a first-degree or first-order mode of transverse vibration of an elastic straight rod which results if the rod is forcedly vibrated at one point with all the points thereof being free to move transversely. The two nodes of the second mode II of the mounting member 10 are denoted by the reference characters N1 and N2 in FIG. 2(b). The positions of the nodes N1 and N2 can be seen to be between the center and the respective ends of the mounting member 10.

The phases of the first and second modes I and II are the same in sign at points to the outside of the nodes N1 and N2 of the second mode II, but are opposite in sign at points between the nodes N1 and N2 of the second mode II. In other words, the direction of the displacement of the mounting member 10 caused by the first mode I and that caused by the second mode II are opposite at points between the nodes N1 and N2 of the second mode II but are same at points to the outside of the nodes N1 and N2 of the second mode II. As a result, the actual vibration of the mounting member 10 approximately expressed by the sum or resultant of the first and second modes I and II has nodes at points A1 and A2 slightly inside the nodes N1 and N2 respectively. Generally, since both the first and second modes I and II are symmetrical with respect to the transverse bisector of the mounting member 10, the points A1 and A2 of the nodes in the actual vibration of the mounting member 10 are equidistant from the center of the mounting member and on opposite sides thereof. The amplitude of the actual vibration of the mounting member 10 is smaller that that given by the second mode II at points between the nodes N1 and N2, and is greater than that given by the second mode II at points to the outside of the nodes N1 and N2.

The positions of the connection of the mounting member 10 to the brackets 20 and 22 or the insulators 24 and 26 are preferably chosen to essentially coincide with the nodes A1 and A2 of the actual vibration of the mounting member 10, in order to minimize transmission or conduction of vibration between the mounting member 10 and the vehicle body 12. The positions of the connections of the mounting member 10 to the brackets 20 and 22 or the insulators 24 and 26 may alternatively coincide with any other points between the nodes N1 and N2 at which the phases or the displacement directions of the first and second modes I and II are opposite in sign.

Figure 3:
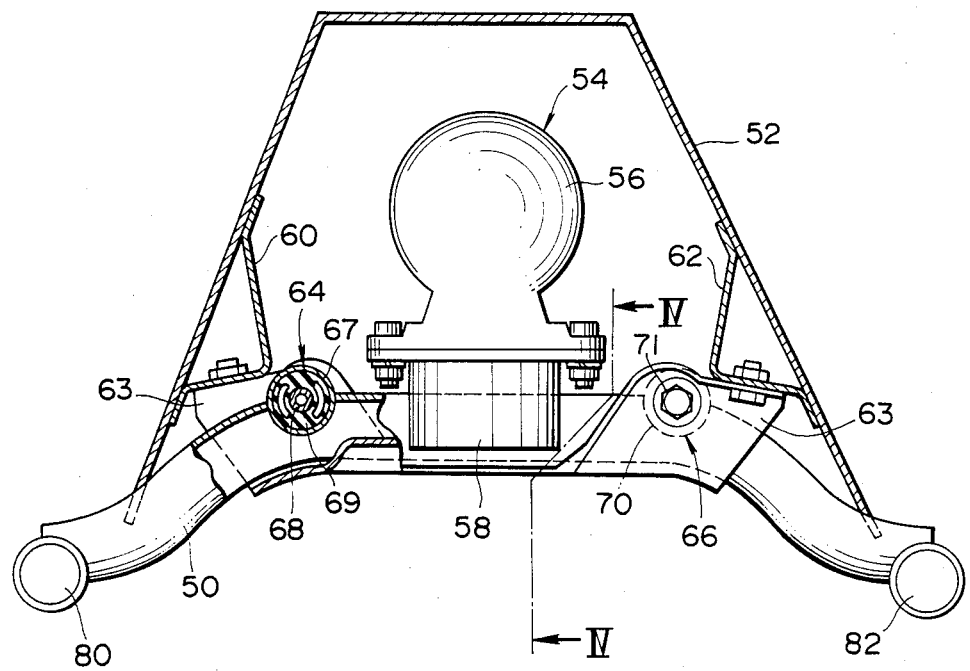
FIG. 3 is a plan view partially cut away of an automotive power transmission mounting structure according to a second embodiment of this invention.
Figure 4:
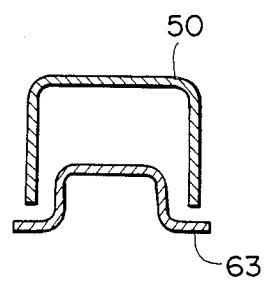
FIG. 4 is a cross-sectional view of the mounting member and the bracket taken along line IV—IV of FIG. 3.

FIGS. 3 and 4 show another embodiment of this invention, in which an elongated mounting member 50 consists of an inverted-U-shaped shape-steel beam having a predetermined elasticity. The mounting member 50 extends substantially perpendicular to the longitudinal axis of an automotive vehicle body 52 and below an automotive power transmission 54. The ends of the mounting member 50 curve slightly downwards away from the power transmission 54. The central portion of the mounting member 50 is horizontal when the vehicle is on the horizontal. The lower surface of the vehicle body 52 has a recess accommodating the power transmission 54. A rear extension 56 of the power transmission 54 is mounted essentially at the center of the mounting member 50 and thus at the center of gravity thereof via a resilient insulator 58.

A pair of brackets 60 and 62 are fixed to the vehicle body 52. A laterally-extending channel-shaped bracket 63 is bolted to the brackets 60 and 62. The bracket 63 is located near but spaced from the mounting member 50. The bracket 63 is designed so as to directly contact neither the power transmission 54 nor the insulator 58. The mounting member 50 is connected to the bracket 63 via a pair of resilient insulators 64 and 66 of the concentric bushing type. In this way, the mounting member 50 is resiliently connected to the vehicle body 52. The bracket 63 holds constant the relative positions of the brackets 60 and 62, thereby enhancing the rigidity or strength of the vehicle body 52.

The insulator 64 consists of concentrically-arranged hollow outer and inner rigid cylinders 67 and 68, and a cylindrical resilient member or rubber bushing 69 sandwiched between the outer and inner cylinders 67 and 68. The outer and inner surfaces of the rubber bushing 69 are fixed to the outer and inner cylinders 67 and 68 respectively. The other insulator 66 consists of similar outer and inner cylinders 70 and 71, and a similar resilient member or rubber bushing (not designated). The outer cylinders 67 and 70 are fixed to the mounting member 50, whereas the inner cylinders 68 and 71 are fixed to the channel-shaped bracket 63, in order to achieve resilient connection of the mounting member 50 to the bracket 63 and thus the vehicle body 52.

A pair of weights 80 and 82 are fixed to the ends of the mounting member 50.

When a vibratory external force having a relatively low frequency, for example, of 40–400 Hz or 100–200 Hz is applied to the center of gravity of the mounting member 50, the resulting vibration of the mounting member 50 can be approximately expressed by the sum or resultant of different two vibration modes IA and IIA. The first mode IA is a bounce vibration mode corresponding to the previous first mode I, while the second mode IIA is a two-node transverse vibration mode corresponding to the previous second mode II. The first mode IA results mainly from the resilient connection of the mounting member 50 to the vehicle body 52 via the insulators 64 and 66. The second mode IIA results mainly from the elasticity of the mounting member 50. The masses of the weights 80 and 82 and the positions thereof affect the first and second modes IA and IIA, and more particularly affect the positions of the two nodes of the mounting member vibration expressed by the sum or resultant of the first and second mode IA and IIA.

The positions of the connections of the mounting member 50 to the vehicle body 52 and thus to the insulators 64 and 66 are preferably chosen to coincide with the two nodes of the mounting member vibration expressed by the sum or resultant of the first and second modes IA and IIA, but may be at any other points between the two nodes of the second mode IIA at which the phases of the first and second modes IA and IIA are opposite in sign, that is, the direction of the displacement of the mounting member 50 caused by the first mode IA is opposite to that caused by the second mode IIA.

In the case where the positions of the two nodes of the mounting member vibration expressed by the sum or resultant of the first and second modes IA and IIA are set close to each other by suitably adjusting the masses or the positions of the weights 80 and 82, the mounting member 50 can be connected to the bracket 63 and thus to the vehicle body 52 via a single resilient insulator, the position of which essentially coincides with the position of the two nodes. This arrangement can be advantageously applied to a mounting structure for the front end of a power transmission or drive train.

Figure 5:
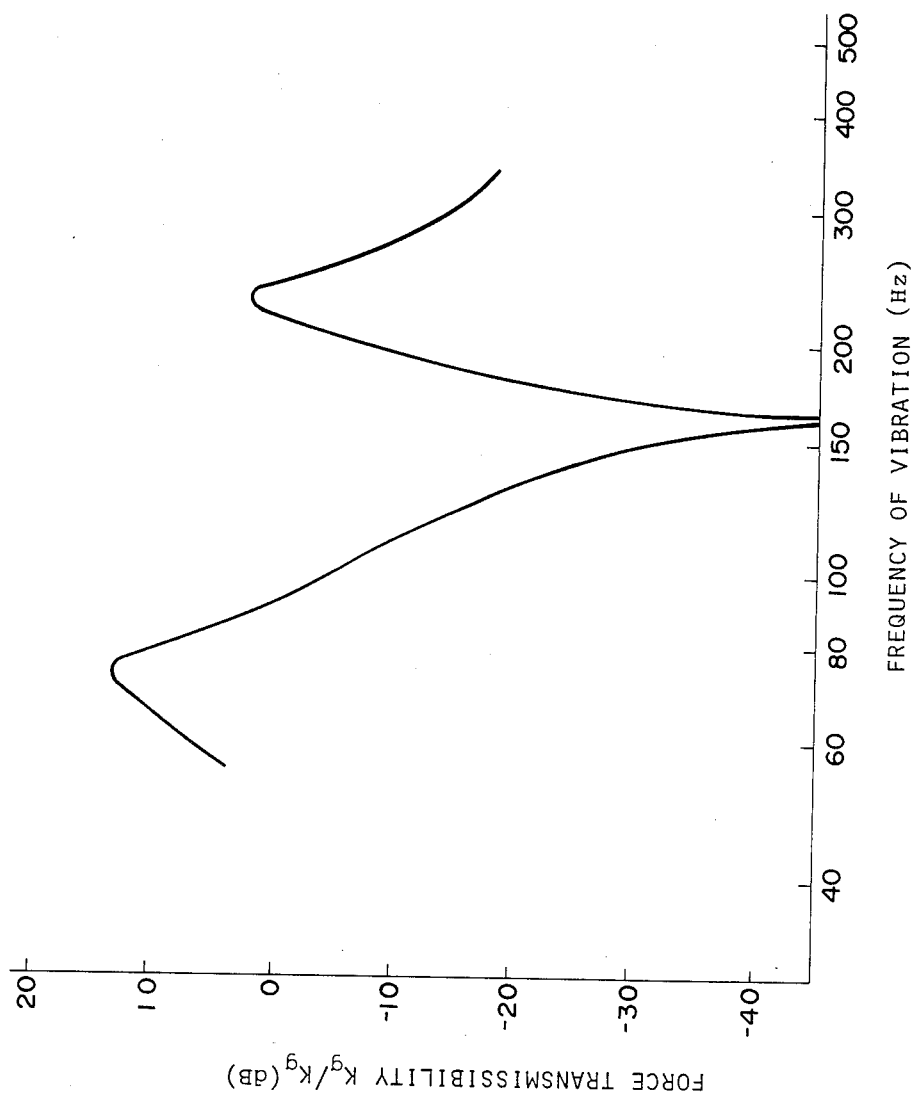
FIG. 5 is a graph of the relationship between the transmissibility and the frequency of vibration achieved by the mounting structure of FIGS. 3 and 4.

FIG. 5 shows a vibration frequency characteristic curve of the force transmissibility of the mounting structure according to the second embodiment, that is, the relationship between the transmissibility and the frequency of the vibration. In this case, the force transmissibility refers to the efficiency of vibration transmission or conduction between the power transmission rear extension 56 and the vehicle body 52, and is consequently given by the logarithm of the ratio in magnitude of a vibratory force which the vehicle body 52 receives to the vibratory force exerted on the power transmission rear extension 56. The transmissibility peaks at frequencies of around 75 Hz and 230 Hz respectively, and bottoms at a frequency of around 160 Hz.

The lower-frequency peak results mainly from the bounce mode IA, so that the frequency at which this peak occurs is determined mainly by the masses of the mounting member 50 and the weights 80 and 82, and the spring moduli of the insulators 64 and 66 with respect to upward and downward movement thereof. The higher-frequency peak results mainly from the two-node transverse vibration mode IIA, so that the frequency at which this peak occurs is determined mainly by the masses of the mounting member 50 and the weight 80 and 82, the length of the mounting member 50, and the elasticity of the mounting member 50. The frequencies of these peaks are chosen so as to be outside of a range in which vibration transmission or conduction is to be avoided. In other words, the frequency range in which vibration transmission or conduction is to be avoided is between the two transmissibility peak frequencies. This peak frequency tuning or selection is based on the fact that the transmissibility is reduced to a remarkable extent at a frequency between the frequencies of the two transmissibility peaks resulting mainly from the first and second modes IA and IIA respectively. Therefore, this peak frequency tuning or selection effectively prevents the vibration of the predetermined particular frequency or frequency band from being transmitted or conducted between the vehicle body 52 and the power transmission rear extension 56.

Usually, vibrations in the frequency range of 100–200 Hz are desired to be prevented from traveling to the vehicle body 52 from the power transmission rear extension 56, since these commonly result in resonant vibrations or noise in and around the vehicle body 52. In view of this fact, the two transmissibility peak frequencies should be chosen such that the 100–200 Hz vibration frequency range is between them to effectively prevent the transmission or conduction of these vibrations. The two transmissibility peak frequencies are preferably around 75 Hz and 230 Hz respectively, which are achieved by the following settings: the mass of each of the weights 80 and 82 is 1.0 kg, the mass of the mounting member 50 is 1.7 kg, the distance between the connections of the mounting member 50 to the insulators 64 and 66 is approximately 190 mm, the horizontal separation of the ends of the mounting member 50 is approximately 446 mm, the vertical separation of the connection of the mounting member 50 to the insulator 64 and the near end of the mounting member 50 to the insulator 66 and the near end of the mounting member 50 are approximately 85 mm, and the spring modulus of the insulators 64 and 66 with respect to upward and downward movement thereof is around 40 kg/mm.

It should be understood that further modifications and variations may be made in this invention without departing from the spirit and scope of this invention as set forth in the appended claims.

What is claimed is:

1. A structure for mounting a vibratory body on a support, comprising:
    (a) an elongated mounting member having an elasticity and vibratable in a bounce mode and a two-node transverse mode;
    (b) means for resiliently connecting the mounting member to the support; and
    (c) means for resiliently connecting the mounting member to the vibratory body;
    (d) the connection of the mounting member to the support being located at a position at which the phase of bounce-mode vibrations of the mounting member is opposite in sign to that of the two-node-mode transverse vibrations of the mounting member.

2. A structure as recited in claim 1, wherein the connection of the mounting member to the vibratory body is located essentially at the center of gravity of the mounting member.

3. A structure as recited in claim 2, wherein the position of the connection of the mounting member to the support is located where the bounce-mode vibrations and the two-node-mode transverse vibrations of the mounting member completely cancel each other in amplitude.

4. A structure as recited in claim 2, wherein the mounting member is connected to the support at two different positions.

5. A structure as recited in claim 4, further comprising a pair of weights fixedly connected to the mounting member.

6. A structure as recited in claim 5, wherein the weights are connected to opposite ends of the mounting member.

7. A structure as recited in claim 2, wherein the efficiency of vibration transmission between the vibratory body and the support peaks at first and second frequencies due to the bounce vibration mode and the transverse vibration mode respectively, wherein the mounting member and the resilient connection of the mounting member to the support are structurally arranged so that a predetermined third frequency is in the range of between the first and second frequencies, and wherein the third frequency is such that vibrations having the third frequency are prevented from traveling to the support from the vibratory body.

8. A structure as recited in claim 7, wherein the first frequency is lower than the predetermined third frequency, while the second frequency is higher than the predetermined third frequency.

9. A structure as recited in claim 8, wherein the predetermined third frequency is in the range of from 100 to 200 Hz.

10. A structure as recited in claim 9, wherein the first frequency is around 75 Hz, and the second frequency is around 230 Hz.

11. A structure for mounting a vibratory body on a support, comprising:
    (a) an elongated mounting member having an elasticity and vibratable in a bounce mode and a two-node transverse mode, the mounting member having first and second end portions, a central portion substantially equidistant from the end portions, a first intermediate portion between the central portion and the first end portion, and a second intermediate portion between the central portion and the second end portion, the central portion being substantially equidistant from the first and second intermediate portions, the first intermediate portion including a first point at which the bounce-mode vibrations and the two-node-mode transverse vibrations of the mounting member substantially cancel each other, the second intermediate portion including a second point at which the bounce-mode vibrations and the two-node-mode transverse vibrations of the mounting member substantially cancel each other, the central portion being substantially equidistant from the first and second points;

(b) means for resiliently connecting the first point of the mounting member to the support;

(c) means for resiliently connecting the second point of the mounting member to the support; and (d) means for resiliently connecting the central portion of the mounting means to the vibratory body.

12. A structure as recited in claim 11, further comprising first and second weights attached to the first and second end portions of the mounting member respectively.

* * * * *